US006091861A

United States Patent [19]
Keyes et al.

[11] Patent Number: 6,091,861
[45] Date of Patent: Jul. 18, 2000

[54] SHARPENING ALGORITHM ADJUSTED FOR MEASURED EXPOSURE OF PHOTOFINISHING IMAGES

[75] Inventors: Michael P. Keyes; Karen A. Hoff, both of Fairport, N.Y.

[73] Assignee: Eastman Kodak Company, Rochester, N.Y.

[21] Appl. No.: 09/017,634

[22] Filed: Feb. 3, 1998

[51] Int. Cl.[7] ........................................................ G06K 9/40
[52] U.S. Cl. ............................ 382/299; 382/263; 382/264; 382/260
[58] Field of Search ............................ 382/199, 261–269, 382/298–300, 260

[56] References Cited

U.S. PATENT DOCUMENTS

| | | | |
|---|---|---|---|
| 4,571,635 | 2/1986 | Mahmoodi et al. | 358/284 |
| 4,991,092 | 2/1991 | Greensite | 382/54 |
| 5,051,842 | 9/1991 | Shimazaki | 358/447 |
| 5,051,902 | 9/1991 | Hishinuma | 364/413.13 |
| 5,081,692 | 1/1992 | Kwon et al. | 382/54 |
| 5,390,264 | 2/1995 | Ishihara et al. | 382/54 |
| 5,485,534 | 1/1996 | Takemoto et al. | 382/263 |
| 5,579,405 | 11/1996 | Ishida et al. | 382/197 |
| 5,651,078 | 7/1997 | Chan | 382/261 |
| 5,978,518 | 11/1999 | Oliyide et al. | 382/260 |

OTHER PUBLICATIONS

"Print Grain Index—An Assessment of Print Graininess from Color Negative Films," Kodak Publication No. E–58, Catalog #8875809, 1994.

J.J. DePalma et al., "Sine Wave Response of the Visual System. II. Sine–Wave and Square–Wave Contrast Sensitivity," Journal of the Optical Society of America, vol. 52, No. 3, Mar. 1962, pp. 328–335.

G.M. Einhaus, "Granularity and Graininess Metrics for Color Negative Films," SPSE 43rd Annual Conference Proceedings, Springfield, Virginia, 1990, pp. 209–210.

T.O. Maier et al., "The Relationship Between Graininess and Granularity," SPSE 43rd Annual Conference Proceedings, Springfield, Virginia, 1990, pp. 207–208.

C.J. Bartleson, "Predicting Graininess from Granularity," The Journal of Photographic Science, vol. 33, 1985, pp. 117–126.

*Primary Examiner*—Thomas D. Lee
*Assistant Examiner*—Stephen Brinich
*Attorney, Agent, or Firm*—William F. Noval

[57] ABSTRACT

A method for processing a digital image comprising the steps of: providing a digital image from an original image on exposed photographic media; determining the exposure of the original image; and based on the exposure, sharpening the digital image using an image sharpening system. A method of processing a digital image comprising the steps of: providing a digital image from an original image on exposed photographic media; determining the type of the photographic media and magnification to produce the final image; and based on the type of the photographic media, sharpening the digital image using an image sharpening system. A method of processing a digital image comprising the steps of: providing a digital image from an original image on exposed photographic media and magnification to produce the final image; determining the type of the photographic media; determining the exposure of the original image; deriving the print grain index from the media type, magnification, and exposure of the original image; determining the sharpening level of the digital image based on the print grain index; and sharpening the digital image using an image sharpening system.

11 Claims, 4 Drawing Sheets

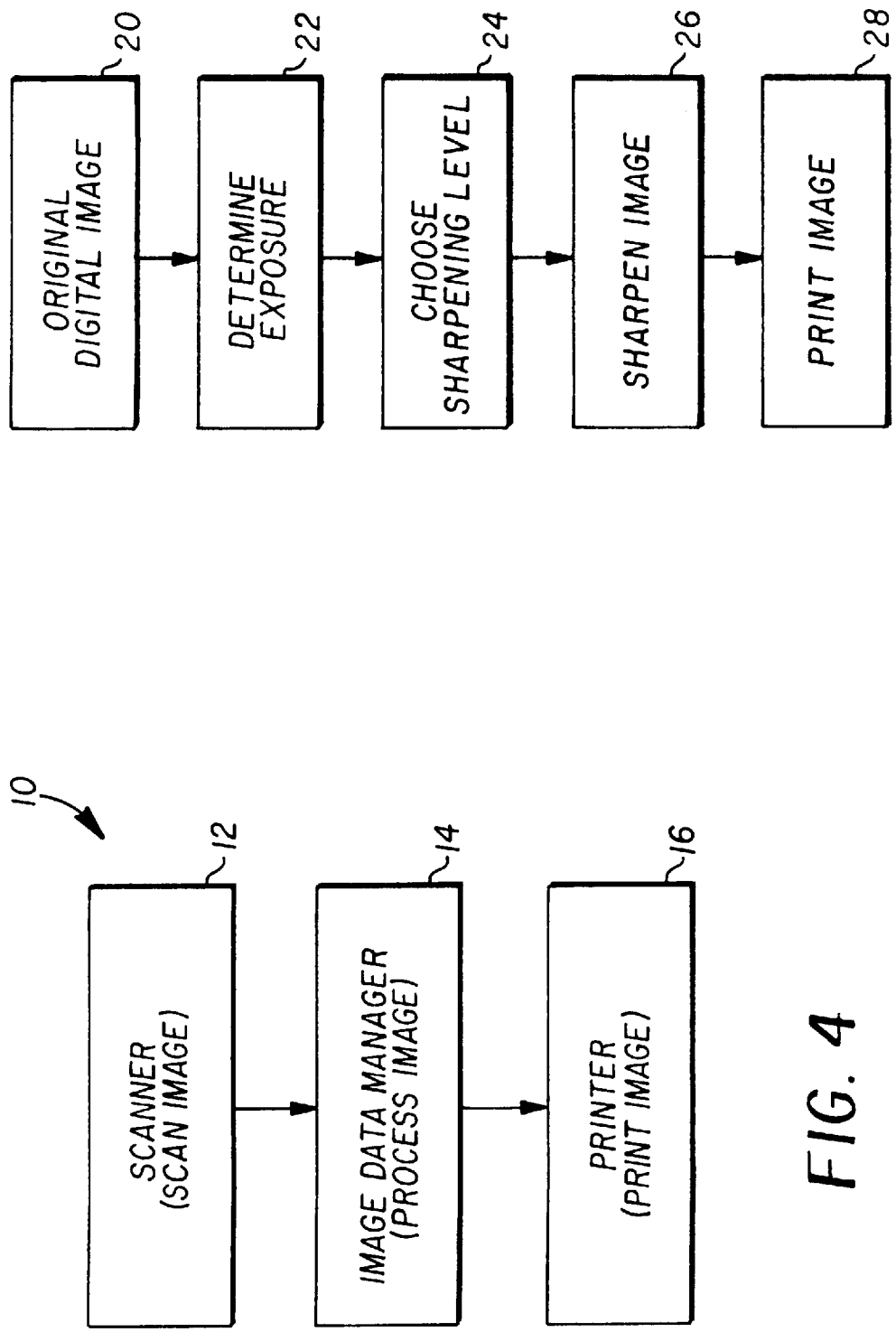

SHARPENING ALGORITHM ADJUSTED FOR MEASURED EXPOSURE OF PHOTOFINISHING IMAGES

FIELD OF THE INVENTION

This invention relates in general to digital imaging systems, and relates more particularly to digital photofinishing systems incorporating an image sharpening system adjusted for measured exposure of photofinishing images.

BACKGROUND OF THE INVENTION

A digital photofinishing system includes a film scanner, an image data manager (IDM), and a printer to make photographic prints. The system is designed to scan photographic color negative and reversal camera films, apply a set of image processing steps to those images in the IDM, and print them to photographic paper.

Specifically, the system is designed for high volume photofinishing which is commonly used to produce prints for non-professional consumer customers. These systems are commonly used in wholesale and minilab applications, where high productivity, measured by the number of images processed in a specific period of time, is very important.

Random signal variations in a digital image are known as "noise." Excessive levels of noise are objectionable to customers. One major source of noise is the granularity of the film that is scanned. Film granularity increases with film speed, i.e., from ISO 100 to 800 speed, and increases with smaller format, e.g., from 35 mm to the Advanced Photo System (APS). The granularity of films generally increases with the degree of under-exposure.

A specific problem arises with certain image processing steps that enhance the appearance of noise in the images. Specifically, sharpening can enhance the noise to an objectionable level. This is of particular concern for high speed films, like ISO 800 speed, for smaller format films, like APS, and for all under-exposed film images.

At the sharpening step, an unsharp mask is applied to the image. The general equation for the unsharp mask is $D_{sharp} = D_{orig} + K*(D_{orig} - D_{blurred})$ where $D_{sharp}$ is the sharpened image, $D_{orig}$ is the original image, $D_{blurred}$ is a blurred version of the image, and K is a scalar constant.

FIGS. 1–3 conceptually demonstrate the trade-offs between random variations on density, referred to as noise, and sharpening levels. Plots are shown of 30 representative pixels of a flat field area of a digital image. The y-axis represents the deviation of each pixel code value from a density code value average for the flat field. The units of the code value deviations are arbitrary, and the density code value average is simply specified as zero.

The dash/dot lines, called the "objection limit," represent a threshold beyond which the density variations become objectionable to someone viewing the images. The objection limit in FIGS. 1–3 is arbitrary because it varies considerably depending on many factors, including the inherent modulation transfer functions for the printer and the photographic paper. Also, the size of the output images and the viewing conditions, such as the illuminant, are factors that affect the objection limit.

The objection limit can be a function of absolute density variations, a standard deviation of density variations, or some other statistical measurement.

FIG. 1 is the plot of 30 representative pixels of a flat field area of a digital image with no sharpening applied. All the density code value variations are well within the objection limit. The density code value variations will be mostly dependent on the inherent granularity of the camera film.

FIG. 2 is a plot of the same 30 pixels with a certain arbitrary level of sharpening applied. The exact level of sharpening depends on the blurring filter and the constant, K, from the unsharp masking equation. All the density code value variations have increased, due to the sharpening process, to a level where some of the variations approach the objection limit.

The sharpening demonstrated in FIG. 2 represents an acceptable level, based on the level of noise, to someone viewing the final image.

FIG. 3 is a plot of the same 30 pixels with a higher arbitrary level of sharpening applied. This situation represents where the constant, K, from the unsharp mask equation is higher than for the situation depicted in FIG. 2. All the density code value variations have increased, due to the sharpening process, to a level where some of the variations are beyond the objection limit.

The sharpening demonstrated in FIG. 3 represents an unacceptable level, based on the excessive level of noise, to someone viewing the final image.

Adjusting the value, K, in the unsharp mask equation is the most common way to control the amount of sharpening in an image. In the following three examples, the sharpening level is varied by adjusting the value, K, pixel-by-pixel based on a calculated estimate of the noise in the immediate region around each pixel. The noise calculation is performed on a neighborhood of pixels surrounding the pixel to be modified.

Mahmoodi and Nelson (U.S. Pat. No. 4,571,635) describe a method for adjusting the value, K, based on the calculated standard deviation of pixel values in the neighborhood immediately surrounding the pixel to be modified. The value, K, varies pixel-by-pixel.

Kwon and Liang (U.S. Pat. No. 5,081,692) describe a method for varying the sharpening by calculating the value, K, with a "centered weighted variance process." The value, K, varies pixel-by-pixel. This process estimates the noise in the neighborhood surrounding the pixel to be modified by weighting each of the neighborhood pixels depending on their location within the neighborhood.

Ishihara, Yamashita, and Fukushima (U.S. Pat. No. 5,390,264) describe a method where the value, K, is a function of the difference in values between the pixel to be modified and selected pixels in the surrounding neighborhood.

While varying the sharpening level pixel-by-pixel may be desirable, the methods which use this approach are demanding relative to the computing time required. This is counter to the need in consumer photofinishing applications for high productivity, which is measured by the number of images processed in a specific period of time.

Also, while methods which vary the sharpening level pixel-by-pixel are frequently appropriate for images for professional customers, they provide image quality benefits which are neither desired nor appreciated by non-professional consumers.

In addition, there are other methods for adjusting the sharpening level.

Shimazaki U.S. Pat. No. 5,051,842 describes an apparatus which generates unsharp signals from images, derives two parameters based on either the image signal level or the unsharp signal level from a pre-determined lookup table, multiplies one parameter with the image signal, multiplies the other parameter with the unsharp signal, and adds the two resulting signals to obtain the final image signal. One embodiment requires that the sum of the two parameters equal one for all image signal levels. In this case, the method is mathematically equivalent to the unsharp mask equation.

Shimazaki teaches that the two parameters are signal dependent with the signals representing image highlights resulting in the highest degree of sharpening. The two parameters are chosen such that the sharpening decreases as either the image signal or the unsharp signal decreases until the sharpening level is zero. At that point, the sharpening converts to blurring as the image signal or unsharp signal continue to decrease into the shadow region of the density range. Shimazaki's apparatus suffers from not accounting for different film speeds, film formats, and exposure levels.

Greensite U.S. Pat. No. 4,991,092 describes an imaging technique for enhancing the contrast of medical images which is dependent on measured noise. The noise is measured on a flat field part of the image and the results are used to modify the contrast enhancement. The technique is very restrictive because each image requires the presence of a suitable flat field area.

These examples have only discussed optimizing the sharpening level with respect to noise in the digital image. None of them have considered the effect of the magnification of the image when making the final print. Magnification is necessary to convert the image from a small format, such as 35 mm, on a color negative or reversal film to a large format, such as 4"×6", which can be easily viewed. None of the prior art considers the effect of viewing condition for the final image. The proper optimization of sharpening must account for the noise, the magnification level, and the viewing condition of the final image.

SUMMARY OF THE INVENTION

According to the present invention, there is provided a solution to these problems.

According to a feature of the present invention, there is provided a method for processing a digital image comprising the steps of: providing a digital image from an original image on exposed photographic media; determining the exposure of the original image; and based on the exposure, sharpening the digital image using an image sharpening system.

According to another feature of the present invention, there is provided a method of processing a digital image comprising the steps of: providing a digital image from an original image on exposed photographic media; determining the type of the photographic media and magnification to produce the final image; and based on the type of the photographic media and magnification to produce final image, sharpening the digital image using an image sharpening system.

According to another feature of the present invention, there is provided a method of processing a digital image comprising the steps of: providing a digital image from an original image on exposed photographic media; determining the type of the photographic media and magnification to produce the final image; determining the exposure of the original image; determining the sharpening level for the digital image based on the exposure and the media type and magnification; and sharpening the digital image using an image sharpening system.

According to another feature of the present invention, there is provided a method of processing a digital image comprising the steps of: providing a digital image from an original image on exposed photographic media; determining the type of the photographic media and magnification to produce the final image; determining the exposure of the original image; deriving the print grain index from the media type, magnification, and exposure of the original image; determining the sharpening level for the digital image based on the print grain index; and sharpening the digital image using an image sharpening system.

ADVANTAGEOUS EFFECT OF THE INVENTION

The invention has the following advantages.

1. The sharpening of an image is optimized for noise present in the original image according to the first feature.

2. The sharpening of an image is optimized for the noise which is estimated to be perceived by a viewer of the final print in the second, third, and fourth features.

3. One sharpening level is applied globally to the entire image to sharpen it. This avoids disadvantageous pixel-by-pixel sharpening which requires excessive computing time which would be detrimental to high speed photofinishing needs.

BRIEF DESCRIPTION OF THE DRAWINGS

FIG. 4 is a block diagram of a digital photofinishing system incorporating the present invention.

FIGS. 5–8 are flow diagrams useful in explaining the present invention.

DETAILED DESCRIPTION OF THE INVENTION

Figure 1:
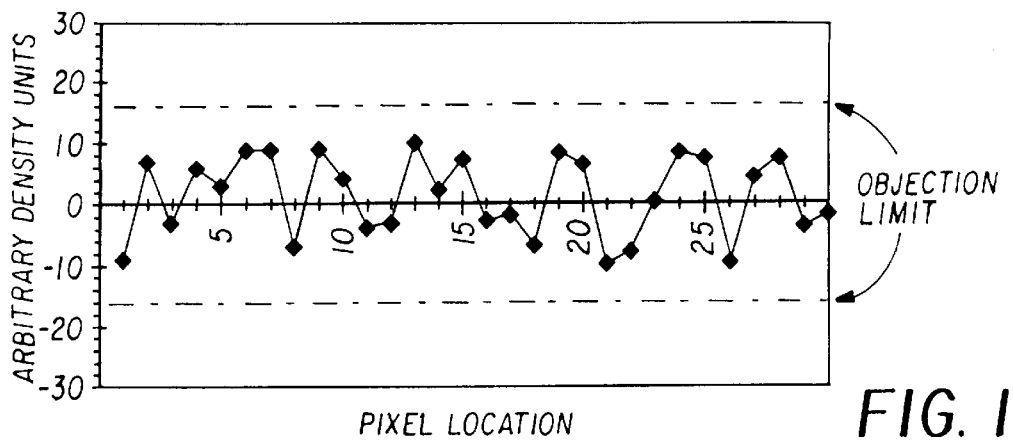
FIGS. 1–3 are graphical views useful in demonstrating noise in images.
Figure 2:
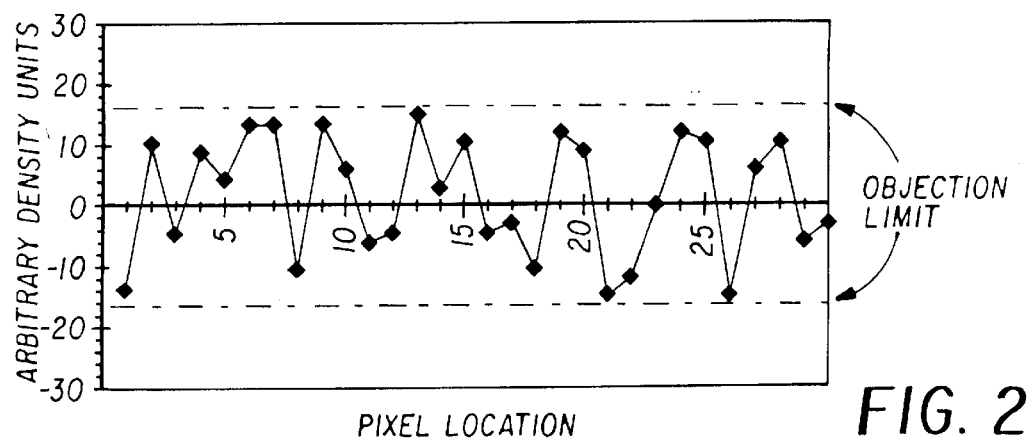
Figure 3:
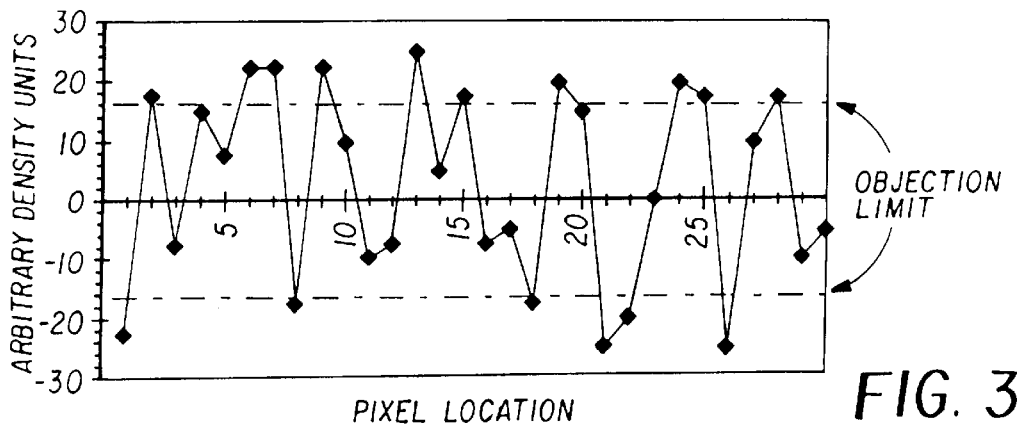

The invention entails adjusting the sharpening level for a digital image scanned from photographic film based on an estimate of the noise due to film granularity that is present in the image. The invention allows for one sharpening level to be assigned to each image to simplify the sharpening operation, relative to the prior art, and to make the sharpening calculation more efficient and practical to use in photofinishing applications.

Referring to FIG. 4, there is shown a digital photofinishing system incorporating the present invention. As shown, system 10 includes a scanner 12, an image data manager 14, and a printer 16. Scanner 12 scans a photographic color negative or color reversal film (slide) to produce a pixellated original digital image constituting a m×n matrix of pixels of "m" pixels per row×"n" rows. Image data manager (IDM) 14 (which can be a general purpose digital computer) applies a set of image processing steps to an original digital image to produce a processed image for printing. Printer 16 prints the processed image onto an output medium appropriate for viewing the image. Printer 16 is preferably a high speed laser printer, but can also be a CRT printer, a thermal printer, an ink jet printer or an electrophotographic printer. The output medium is preferably photographic print papers, but may be other media specific to alternate output devices. The photofinished image can be a color image or a black and white image.

Referring now to FIG. 5, there will be described an embodiment of the present invention. Original digital image 20 is processed in IDM 14. The first step of the method is to determine the exposure of the original digital image 20 (box 22). The exposure can be derived from data recorded by the film taken at the time the image was photographed (e.g., the APS format can record exposure data). The exposure can also be estimated any time in the image processing path before the sharpening step. Preferably, this method is made using a scene balance algorithm in a scene based system (refer to Appendix I).

The sharpening level is chosen based on a predetermined relationship with respect to the exposure (box 24). Thereafter, the image is sharpened (box 26) using an unsharp mask system and printed (box 28).

Figures 6, 7:
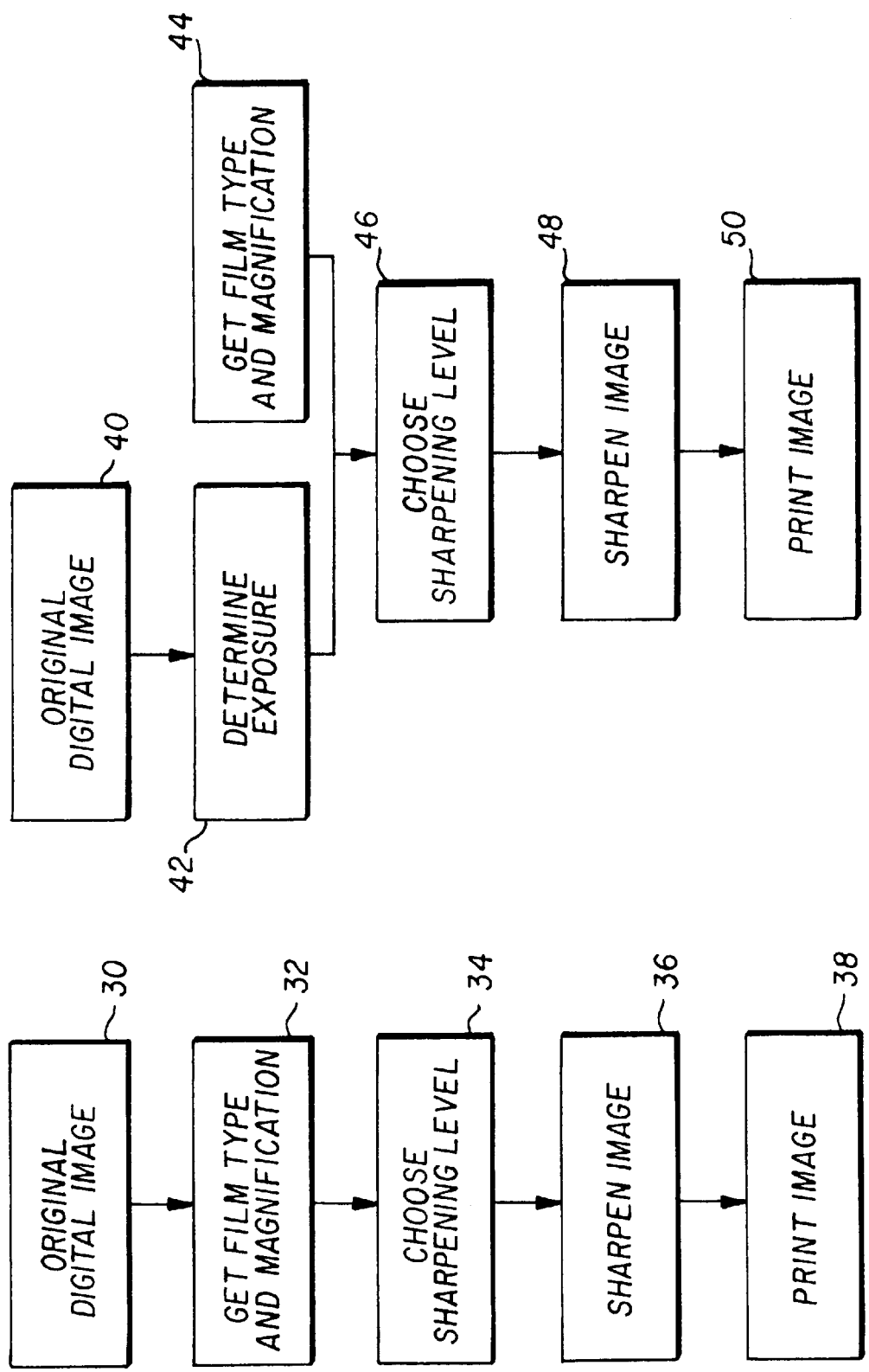

Referring now to FIG. 6, there will be described another embodiment of the present invention. Original digital image 30 is processed in IDM 14 (FIG. 4). The first step of the method is to get the film type and magnification (box 32). The film type can be read from the film by an automatic device or entered into IDM 14 by the operator. Film type parameters include film speed (e.g., 100, 800), reversal or negative film, and format size (e.g., 35 mm, APS). The magnification is that factor which is necessary to multiply with the original digital image 30 to obtain the final image.

Next, the sharpening level is chosen based on the film type and magnification (box 34). The image is sharpened using an unsharp mask system (box 36). The sharpened image is then printed (box 38).

Referring now to FIG. 7, there is shown another embodiment of the present invention which combines the methods of FIGS. 5 and 6. Original digital image 40 is processed in IDM 14 (FIG. 4). The first steps are to determine exposure of the original image (box 42) and get film type and magnification (box 44). The sharpening level is chosen (box 46) based on both the exposure of the original image and the film type and magnification. The original digital image is sharpened (box 48) using an unsharp mask system, and the sharpened image is printed (box 50).

Figure 8:
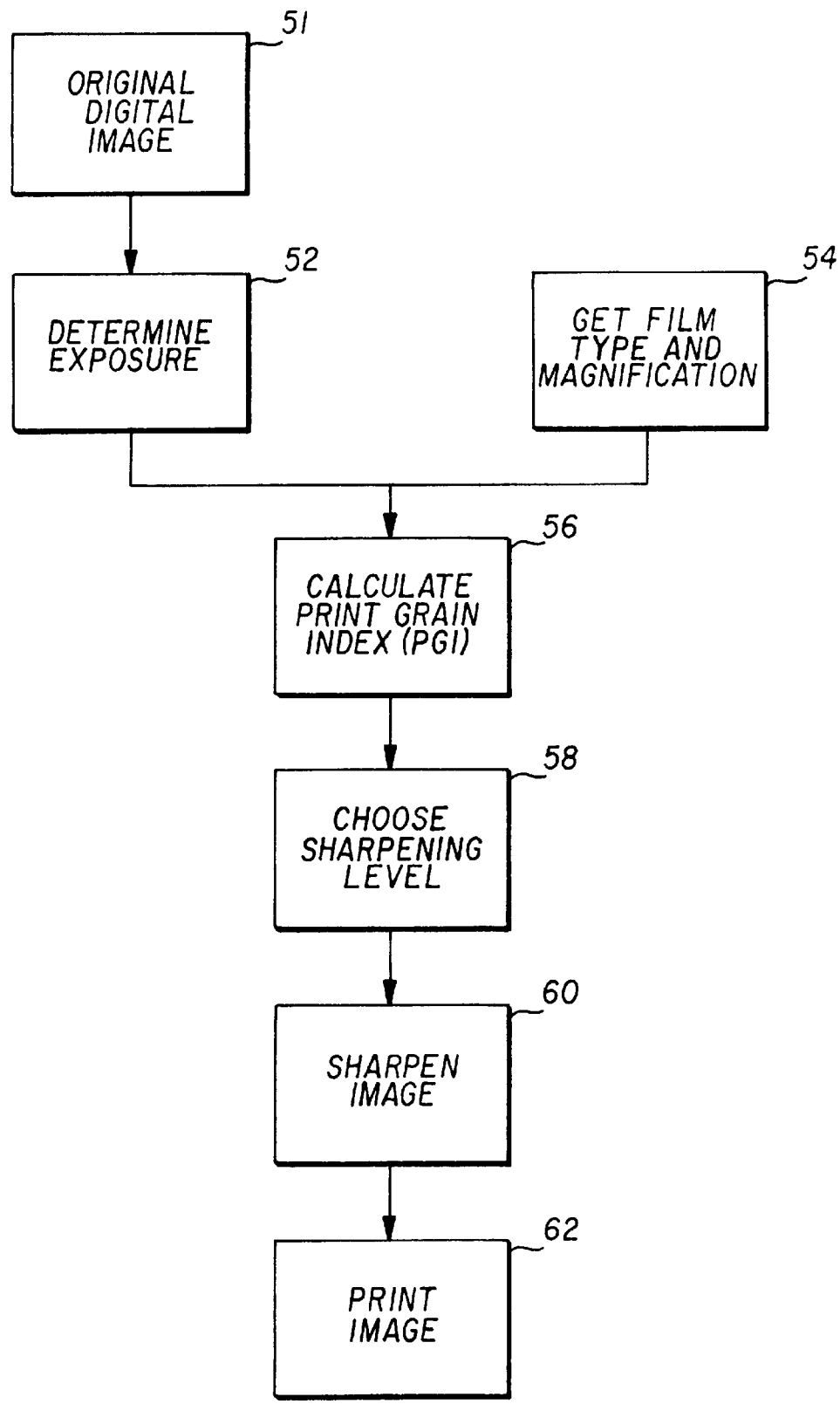

FIG. 8 illustrates a preferred method of carrying out the method of FIG. 7. The original digital image (box 51) is processed in IDM 14 (FIG. 4). Exposure is determined (box 52) and film type and magnification are obtained (box 54). The next step is to calculate the Print Grain Index based on the exposure, film type, and magnification (box 56). The sharpening level is chosen based on a previously defined relationship between the constant, K, from the unsharp mask equation and the PGI value previously stored in memory (box 58). The image is sharpened by an unsharp mask system using the chosen sharpening level (box 60). The sharpened image is then printed (box 62).

The key feature of the preferred embodiment illustrated in FIG. 8 is the step to calculate the PGI value (box 56). This step calculates one value which corresponds to an estimate of the noise, as visually perceived by the viewer, that is present in the final image. This is done by attempting to account for all the factors that affect how the noise is perceived by the viewer of the final image. The PGI value calculation step (box 56) requires the film type, magnification, and the exposure of the original image as input.

The noise level that is perceived in the final image is dependent on many variables, with the major ones being film speed, exposure level for the original image, and magnification to produce the final image from the original image.

A detailed description is now provided for the PGI calculation step. Other references for helping to understand this method include "Print Grain Index—An assessment of Print Graininess for Color Negative Film," Kodak publication No. E58, catalog #8875809, 1994, E. C. Doerner, *Journal of the Optical Society of America*, 1962, 52, p. 328; G. M. Einhaus *SPSE's 43rd Annual Conference Proceedings*, SPSE, Springfield, Va., 1990, pp. 209–210; T. O. Maier and D. R. Miller, *SPSE's 43rd Annual Conference Proceedings*, SPSE, Springfield, Va., 1990, pp. 207–208; C. J. Bartleson, *The Journal of Photographic Science*, 1985, 33, pp. 117–126.

There are three steps involved with the PGI calculation step. The description of the steps assume images are being printed to photographic paper from color negative film.

Step 1—Conversion from Negative Granularities to Print Granularities

In this step, the measured granularity of the film is correlated with the measured granularity that would be transferred to the print. The general equation is $$P_t = P_3 + P_1 \gamma_3{}^2 M_g{}^2 M_2{}^2 M_3{}^2 \qquad (1)$$

where $\gamma_3$ is the measured gamma of the photographic paper. $M_g$ is the magnification that is necessary to convert the image from the negative format to the print format. $M_2$ and $M_3$ are the modulation transfer functions for the optics in the printing step and the photographic paper, respectively. $P_t$, $P_1$, and $P_3$ are frequency noise functions for the print, color negative film, and the photographic paper, respectively. These functions are commonly referred to as Wiener Spectra. In general, $$P = \sigma_f{}^2 \qquad (2)$$

where $\sigma_f$ is the standard deviation of density fluctuations in a narrow band of spatial frequencies centered at frequency, f.

Two assumptions can be made to simplify equation 1. First, the contribution of the photographic paper to the granularity of the print is assumed to be small compared to the contribution of the color negative film, i.e., $P_3$ can be considered zero.

Second, all frequency dependent terms are assumed to be independent of frequency in the range that is visually significant. Therefore, modulation transfer functions ($M_2$ and $M_3$) are assigned the values they would have at 1 cycle/mm. Also, the frequency noise functions, P, become constants which are proportional to the square of standard deviation of densities, σ, multiplied with the appropriate microdensitometer scanning aperture, A. This relationship is well known as Selwyn's Law:

$$P \, \alpha \sigma^2 A \qquad (3)$$

The following equation is thus obtained:

$$\sigma_t = \sigma_1 (A_1/A_t)^{1/2} \gamma_3 M_g M_o M_p \qquad (4)$$

where $\sigma_t$ and $\sigma_1$ are the standard deviation of densities of the image on the photographic print and the color negative, respectively. $A_t$ and $A_1$ are the scanning aperture sizes to measure the $\sigma_t$ and $\sigma_1$, respectively. $M_g$ is the magnification that is necessary to convert the image from the negative format to the print format. $M_o$ and $M_p$ are the values of the modulation transfer functions for the optics in the printing step and the photographic paper, respectively, at the frequency of 1 cycle/mm. The terms, $M_g$, $M_o$, and $M_p$, may be considered collectively as a constant. $K_{opt}$, for a specific optical print system. The terms, $A_1$ and $A_t$, may be considered collectively as a constant, $K_{mea}$, for a particular granularity measurement system.

The major conclusion from equation 4 is that, a linear relationship exists between the measured granularity on the color negative film, $\sigma_1$, and the measured granularity on the photographic print, $\sigma_t$. The film type and the exposure of the original image affect the $\sigma_1$ and, therefore, they also affect ($\sigma_t$.

Step 2—Conversion from Print Granularities to Visual Granularities

This step accounts for the different color sensitivities of the human visual system and correlates these differences to the measured granularity of the print from step 1.

There is a relationship that has been previously defined for converting standard deviations of red, green, and blue densities ($\sigma_r$, $\sigma_g$, and $\sigma_b$) to a single value called visual granularity ($\sigma_t$).

$$\sigma_t = [C_r \sigma_r^2 + C_g \sigma_g^2 + C_b \sigma_b^2]^{1/2} \quad (5)$$

$C_r$, $C_g$, and $C_b$ are constants, the sum of which must equal 1.0. They were assigned as follows $$C_r = 0.2368 \quad (6)$$

$$C_g = 0.6579 \quad (7)$$

$$C_b = 0.1053 \quad (8)$$

The relationship takes advantage of the fact that the sensitivity of the human visual system is highest for green light, followed by red and blue light.

A preferred embodiment is to make $C_r$, $C_g$, and $C_b$ into functions dependent on the illuminant used to view the final images and the spectral response of the output medium used to print the final images. CIE illuminant A viewing conditions and D5000 spectral response are preferred.

Step 3—Conversion from Visual Granularity to Perceived Graininess

In this step, the visual granularity, $\sigma_t$, calculated in step 2 is correlated with the actual perception of granularity by human viewers.

The following relationship was previously defined between the visual granularity of images and the perceived graininess by human viewers of those images:

$$G = a\{\log[\sigma_t]\} + b \quad (9)$$

where a and b are constants, $\sigma_t$ is the visual granularity, and G is the perceived granularity.

The constants, a and b, are empirically derived assuming that equation 9 represents a linear relationship between log [$\sigma_t$] and G. In order to derive the constants, a and b, prints with patches of various levels of measured visual granularity were shown to 40 human viewers. A series of patches described in U.S. Pat. No. 5,629,769 by R. E. Cookingham and P. J. Kane, entitled "Apparatus and Method for the Measurement of Grain in Images," is preferred. Most preferred is a series of 18 uniform neutral patches at density of 0.8, differing only in varying levels of granularity. The granularity change between steps is 6%. Each patch was rated by each viewer on a scale from 1 to 9. The perceived graininess, G, for each patch was calculated by averaging the ratings from the viewers. A plot was generated of G versus log [$\sigma_t$] which included all the patches. A linear regression of the points resulted in the constants, a and b. The constants, a and b, were calculated to be 80 and −29.64, respectively, resulting in equation 10.

$$G_{pgi} = 80\{\log[\sigma_t]\} - 29.64 \quad (10)$$

where $G_{pgi}$ is the Print Grain Index (PG) for an image with any calculated $\sigma_t$.

Given equation 10, one can derive a PGI value that would characterize the perceived graininess on any size print of an image that originated on any given color negative film. It also follows that any given color negative film can be assigned PGI values corresponding to different size prints that may be created from it.

Once the standard deviations of red, green, and blue densities from a particular color negative film, given a specific exposure, are measured by techniques well known in the art, the print granularity can be calculated using the procedure described in step 1. Note that the color negative format, e.g. 35 mm or Advanced Photo System (APS), and the print size, e.g. 4"×6" or 5"×7", must be known to determine the magnification.

The visual granularity, $\sigma_t$, is calculated from the print granularities as per the procedure in step 2, and the $G_{pgi}$ is calculated with equation 10.

Non-professional photographers frequently have images on film which have been under- or over-exposed, and therefore, exposure dependence on noise must also be taken into account. For any given film type, under-exposed regions of images will give the highest noise (granularity) across the range of possible exposures. It is preferable to calculate PGI values for all reasonable exposure levels for any given film through the PGI calculation method. Preferably, PGI values for 3 stops under-exposed to 6 stops over-exposed for common films would be provided.

The PGI values for all reasonable exposure levels for different film types are previously derived before scanning the films and digitally stored in the system.

When scanning a roll of film from a customer, the film type is either entered into the system manually, or read automatically from the film itself, e.g. a bar code along the margin of the film. The images are scanned and image processing begins. Anytime before sharpening occurs, the exposure level can be estimated. Most commonly, this is done by an algorithm, such as that described in Appendix I. As described, there is disclosed a method for automatically determining and adjusting the amount of print exposure to give to images on a film roll in order to produce acceptable final images. The amount of print exposure to provide such images is directly related to the exposure level of the image on the film roll. Therefore, such a method can be used for determining exposure level of the original images.

The unsharp mask system used has the general equation $$D_{sharp} = D_{orig} + K*(i\, D_{orig} - D_{blurred})$$

where $D_{sharp}$ is the sharpened image, $D_{orig}$ is the original image, $D_{blurred}$ is a blurred version of the image, and K is a scalar constant.

At the time of sharpening, the film type and the exposure level are used to determine the PGI value from those values previously digitally stored. The PGI value, in turn, determines the value, K, from the unsharp mask equation. The relationship between the PGI value, and the value, K, is previously derived and digitally stored in the system. The unsharp mask with the appropriate value, K, is applied to the entire image.

For the following blurring kernel, $$\begin{bmatrix} 0 & 1 & 5 & 1 & 0 \\ 1 & 21 & 38 & 21 & 1 \\ 5 & 38 & 60 & 38 & 5 \\ 1 & 21 & 38 & 21 & 1 \\ 0 & 1 & 5 & 1 & 0 \end{bmatrix} \times \frac{1}{325}$$

empirically, it was found for conditions where $PGI<50, K=2.5$, $50 \leq PGI<54, K=2.0$, $54 \leq PGI<70, K=1.5$, and $PGI>70, K=1.0$.

EXAMPLES

Table 1 shows the PGI and K values for 10 exposures levels which result from scanning images from a representative 200 speed, 35 mm, color negative film. The final image size was assumed to be 4"×6". Note that the PGI is at the highest values for the extreme under-exposed conditions.

TABLE 1

200 speed, 35 mm color negative film going to 4" × 6" final images

| Exposure Level (stops relative to normal) | PGI units | K (at optimal image quality) |
|---|---|---|
| −3 | 57 | 1.5 |
| −2 | 53 | 2.0 |
| −1 | 50 | 2.0 |
| 0 | 48 | 2.5 |
| +1 | 45 | 2.5 |
| +2 | 42 | 2.5 |
| +3 | 38 | 2.5 |
| +4 | 34 | 2.5 |
| +5 | 34 | 2.5 |
| +6 | 34 | 2.5 |

Table 2 shows the PGI and K values for 10 exposures levels which result from scanning images from a representative 800 speed, 35 mm, color negative film. The final image size was assumed to be 4"×6". Note that the PGI is at the highest values for the extreme under-exposed conditions.

TABLE 2

800 speed, 35 mm color negative film going to 4" × 6" final images

| Exposure Level (stops relative to normal) | PGI units | K (at optimal image quality) |
|---|---|---|
| −3 | 93 | 1.0 |
| −2 | 78 | 1.0 |
| −1 | 65 | 1.5 |
| 0 | 61 | 1.5 |
| +1 | 61 | 1.5 |
| +2 | 59 | 1.5 |
| +3 | 60 | 1.5 |
| +4 | 60 | 1.5 |
| +5 | 60 | 1.5 |
| +6 | 60 | 1.5 |

Although the application (digital photofinishing) described above refers to a system for scanning, processing and printing images from color negative and color reversal films, the invention could apply to either color or black and white digital imaging systems. The process of sharpening a digital image can be performed on any combination of the red, green and blue color channels of a digital image. In our examples, sharpening is performed on a single luminance (or neutral) channel, which is created by taking the average of all three (RGB) channels. It could also be applied to a single channel black and white image.

The invention has been described in detail with particular reference to certain preferred embodiments thereof, but it will be understood that variations and modifications can be effected within the spirit and scope of the invention.

APPENDIX I

When images are desired of a particular scene, people will most often photograph the scene with a color negative film and submit the film to a photofinisher for chemical processing. As a result, images are formed on the film, but they are not in a format for easy viewing since the colors are opposite, or negative, from those in the original scenes. The exposure of the scene to the color negative film is called "scene exposure."

Photographic paper is then exposed to the images on the color negative films with illuminants in an optical printer. The photographic paper is then chemically processed to produce visible images that can be easily viewed. The exposure of the photographic paper to the printer illuminant through the negative is called "print exposure."

Color negative films generally have the ability to capture up to 10 stops of scene exposure in each of three color records, red, green, and blue. Photographic paper has a much lower exposure range, generally 4 stops. (An incremental increase of one stop is equivalent to doubling the light exposure.) Therefore, print exposures must be adjusted to allow the scene to be printed on the photographic paper such that it fits within the density range of the paper. In addition, color balance must usually be performed, also by adjusting the print exposures of each separate color illuminant.

Before the days of computers, this adjustment was performed manually. That is, a person employed by the photofinishing service would view each print to insure that that the scene was printed within the density range of the paper. If a print failed it would be reprinted with adjusted print exposures.

High volume photofinishing services require the print exposure adjustments to be made automatically in order to meet productivity requirements. These adjustments are best made by software algorithms, called scene balance algorithms (SBA's), designed to judge each image on the color negative film as to appropriate print exposures.

Generally, SBA's are designed to statistically measure the densities of the organic dyes comprising the image on the color negative film. Based on a statistical distribution of the negative densities, the print exposures for the printer illuminants are determined such that as much of the negative image is within the density range of the photographic paper. These algorithms are frequently used to further adjust the print exposures to achieve the most pleasing color balance in the final image. Exemplary methods are as follows.

Thurm, et al, (U.S. Pat. No. 4,279,502) describe a method and apparatus that photoelectrically measure the color densities on color negative film. The most pleasing color balance is obtained by calculating the differences between the densities of certain specified colors.

Zahn, et al, (U.S. Pat. No. 4,873,546) describe an improved method for measuring the color densities of the images on the color negative films by measuring only specific wavelength regions of the visible spectrum.

Terashita (U.S. Pat. No. 5,081,485) describes a method for determining print exposures by adjusting the measured densities from the negative images as a function of the lowest densities (commonly referred to as Dmin values) on the film.

The preferred SBA in our invention is a method for determining appropriate print exposures by estimating gray levels and by measuring Dmin values for the images on the film. The gray levels are calculated by a mathematical regression from the measured red, green, and blue film densities from numerous regions in the images. The Dmin values are directly measured from the film.

This method can estimate the relative scene exposure for an image. The gray levels represent a range of scene exposures that was necessary to create the film images. Through a statistical analysis of the red, green, and blue values of the estimated gray levels, and the measured Dmin values, an estimate can be made as to the degree that the image was under- or over-exposed.

The estimate of the under- or over-exposure of the image is that which would be combined with the film type to provide a PGI value. The sharpening level is, then, derived from the PGI value.

PARTS LIST

| | |
|---|---|
| 10 | system |
| 12 | scanner |
| 14 | image data manager |
| 16 | printer |
| 20 | orginal digital image |
| 22 | determine exposure |
| 24 | choose sharpening level |
| 26 | sharpen image |
| 28 | print image |
| 30 | original digital image |
| 32 | get film type and magnification |
| 34 | choose sharpening level |
| 36 | sharpen image |
| 38 | print image |
| 40 | original digital image |
| 42 | determine exposure |
| 44 | get film type and magnification |
| 46 | choose sharpening level |
| 48 | sharpen image |
| 50 | print image |
| 51 | original digital image |
| 52 | determine exposure |
| 54 | get film type and magnification |
| 56 | calculate print grain index |
| 58 | choose sharpening level |
| 60 | sharpen image |
| 62 | print image |

What is claimed is:

1. A method of processing a digital image comprising the steps of:

providing a digital image from an original image on exposed photographic media;

determining the type of said photographic media;

determining the magnification necessary to convert said digital image to the final image; and based on the type of said photographic media, sharpening said digital image using an image sharpening system.

2. The method of claim 1 including the step of determining the exposure of said digital image, and wherein said sharpening step uses an image sharpening system based on said exposure as well as said type of said photographic media and said magnification.

3. The method of claim 1 wherein said exposed photographic media is one of negative film, reversal film, and photographic print.

4. The method of claim 1 wherein said type of said photographic media is one or more of the following, film speed, negative or reversal film, format size (e. g., 35 mm, APS).

5. The method of claim 1 wherein said providing step includes the step of scanning an original image on exposed photographic media to produce said digital image.

6. The method of claim 5 including the step of printing said sharpened image on photographic print media.

7. The method of claim 2 wherein said exposure determining step uses a scene based system for estimating exposure.

8. The method of claim 2 wherein said exposure determining step uses exposure data recorded at the time said original image was generated.

9. The method of claim 2 including the step of determining a print grain index based on said exposure, said photographic media type, and said magnification, and wherein said sharpening step uses an image sharpening system which uses said print grain index.

10. The method of claim 9 wherein said image sharpening system is an unsharp masking system and wherein said print grain index is used to determine an image sharpening parameter of said unsharp masking system.

11. A method of processing a digital image comprising the steps of:

providing a digital image from an original image on exposed photographic media;

determining the type of the photographic media;

determining the magnification necessary to convert said digital image to the final image;

determining the exposure of the original image;

deriving the print grain index from the media type, magnification, and exposure of the original image;

determining the sharpening of the digital image based on said print grain index; and sharpening the digital image using an image sharpening system.

* * * * *